United States Patent [19]

Kurzman

[11] Patent Number: 5,368,486
[45] Date of Patent: * Nov. 29, 1994

[54] SYSTEM OF FURNITURE MERCHANDISING AND SELECTION

[75] Inventor: Alan M. Kurzman, Dallas, Tex.

[73] Assignee: Triangle Pacific Corp., Dallas, Tex.

[*] Notice: The portion of the term of this patent subsequent to Oct. 6, 2009 has been disclaimed.

[21] Appl. No.: 934,126

[22] Filed: Aug. 21, 1992

Related U.S. Application Data

[63] Continuation of Ser. No. 510,103, Apr. 17, 1990, Pat. No. 5,152,689.

[51] Int. Cl.5 .............................................. G09B 25/00
[52] U.S. Cl. .......................................... 434/79; 434/72; 434/80
[58] Field of Search .............................. 434/72, 79, 80

[56] References Cited

U.S. PATENT DOCUMENTS

| | | | |
|---|---|---|---|
| 3,191,320 | 6/1965 | Copeland et al. | 434/79 |
| 3,468,593 | 9/1969 | Catlett | 434/79 X |
| 3,945,467 | 3/1976 | Levitz | 434/79 X |
| 4,135,315 | 1/1979 | McKee | 434/80 X |

Primary Examiner—Richard J. Apley
Assistant Examiner—Karen A. Jalbert
Attorney, Agent, or Firm—Kenneth R. Glaser

[57] ABSTRACT

A system for merchandising and selecting pre-fabricated cabinets for installation in a living space. Comprising the system are informational display and selection charts on which a unique code indicia, particularly color coded, is assigned to each cabinet unit. Following a scaled plan layout of the cabinet area in an intended living space for which installation is contemplated, the selected units can be readily retrieved from a merchandising display on which the various units are clearly identified by their codes.

4 Claims, 5 Drawing Sheets

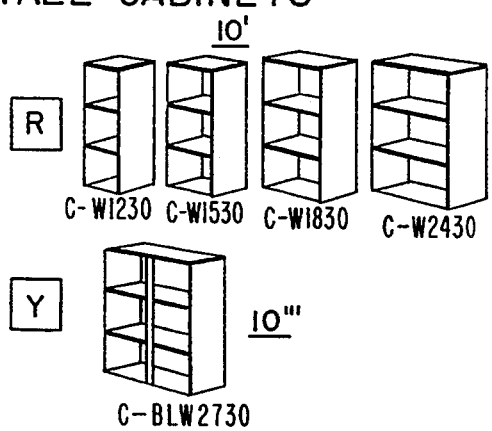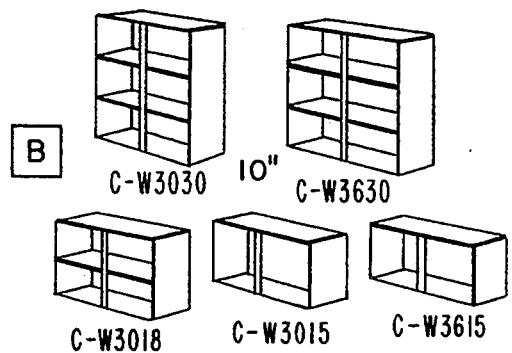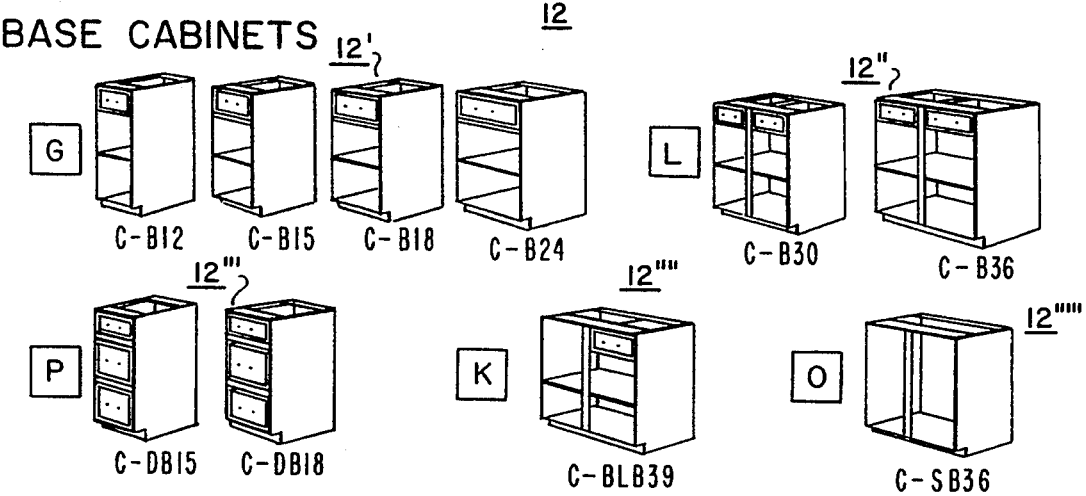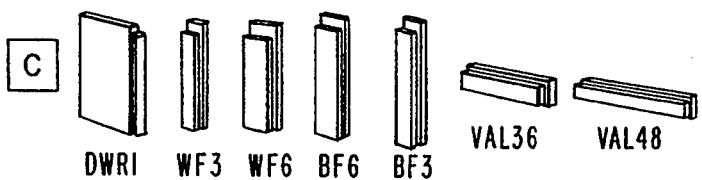
FIG. 1

| BOX NO (14) | COLOR CODE (16) | CABINET MODEL # (18) | DOOR PACKAGE MODEL #'S (CHOOSE ONE PKG PER CABINET) | | CU FT | WT |
|---|---|---|---|---|---|---|
| | | | COLOR W (20) | COLOR A (22) | | |
| WALL CABINETS | | | | | | |
| 1 | R | C-W1230 | | | 1 | 24 |
| | | | DW-W1230 | | 1 | 9 |
| | | | | DA-W1230 | 1 | 9 |
| 2 | | C-W1530 | | | 1 | 28 |
| | | | DW-W1530 | | 1 | 10 |
| | | | | DA-W1530 | 1 | 10 |
| 3 | | C-W1830 | | | 2 | 31 |
| | | | DW-W1830 | | 1 | 12 |
| | | | | DA-W1830 | 1 | 12 |
| 4 | | C-W2430 | | | 2 | 38 |
| | | | DW-W2430 | | 1 | 15 |
| | | | | DA-W2430 | 1 | 15 |
| 5 | B | C-W3030 | | | 3 | 48 |
| | | | DW-W3030 | | 1 | 20 |
| | | | | DA-W3030 | 1 | 20 |
| 6 | | C-W3630 | | | 3 | 56 |
| | | | DW-W3630 | | 1 | 24 |
| | | | | DA-W3630 | 1 | 24 |
| 7 | | C-W3018 | | | 2 | 30 |
| | | | DW-W3018 | | 1 | 14 |
| | | | | DA-W3018 | 1 | 14 |
| 8 | | C-W3015 | | | 2 | 30 |
| | | | DW-W3015 | | 1 | 14 |
| | | | | DA-W3015 | 1 | 14 |
| 9 | | C-W3615 | | | 2 | 36 |
| | | | DW-W3615 | | 1 | 18 |
| | | | | DA-W3615 | 1 | 18 |
| 10 | Y | C-BLW2730 | | | 3 | 57 |
| | | | DW-BLW2730 | | 1 | 18 |
| | | | | DA-BLW2730 | 1 | 18 |
| BASE CABINETS | | | | | | |
| 11 | G | C-B12 | | | 4 | 41 |
| | | | DW-B12 | | 1 | 12 |
| | | | | DA-B12 | 1 | 12 |
| 12 | | C-B15 | | | 5 | 49 |
| | | | DW-B15 | | 1 | 13 |
| | | | | DA-B15 | 1 | 13 |
| 13 | | C-B18 | | | 5 | 56 |
| | | | DW-B18 | | 1 | 15 |
| | | | | DA-B18 | 1 | 15 |
| 14 | | C-B24 | | | 6 | 71 |
| | | | DW-B24 | | 1 | 18 |
| | | | | DA-B24 | 1 | 18 |
| 15 | L | C-B30 | | | 6 | 89 |
| | | | DW-B30 | | 1 | 26 |
| | | | | DA-B30 | 1 | 26 |
| 16 | | C-B36 | | | 8 | 107 |
| | | | DW-B36 | | 1 | 30 |
| | | | | DA-B36 | 1 | 30 |
| 17 | P | C-DB15 | | | 8 | 63 |
| | | | DW-DB15 | | 1 | 13 |
| | | | | DA-DB15 | 1 | 13 |
| 18 | | C-DB18 | | | 8 | 65 |
| | | | DW-DB18 | | 1 | 15 |
| | | | | DA-DB18 | 1 | 15 |
| 19 | K | C-BLB39 | | | 8 | 140 |
| | | | DW-BLB39 | | 1 | 24 |
| | | | | DA-BLB39 | 1 | 24 |
| 20 | O | C-SB36 | | | 3 | 62 |
| | | | DW-SB36 | | 1 | 30 |
| | | | | DA-SB36 | 1 | 30 |
| DISHWASHER RETURNS, FILLERS & VALANCES | | | | | | |
| 21 | C | | W-DWRI-1/2 | | 1 | 21 |
| | | | | A-DWRI-1/2 | 1 | 21 |
| 22 | | | W-WF3 | | - | 5 |
| | | | | A-WF3 | - | 5 |
| 23 | | | W-WF6 | | - | 9 |
| | | | | A-WF6 | - | 9 |
| 24 | | | W-BF3 | | - | 6 |
| | | | | A-BF3 | - | 6 |
| 25 | | | W-BF6 | | - | 10 |
| | | | | A-BF6 | - | 10 |
| 26 | | | W-VAL36 | | - | 11 |
| | | | | A-VAL36 | - | 11 |
| 27 | | | W-VAL48 | | - | 15 |
| | | | | A-VAL48 | - | 15 |

KEY: PREFIX - C = CABINET (WHITE ONLY)
DW = DOOR (WHITE) PACKAGE
DA = DOOR (ALMOND) PACKAGE
W = WHITE
A = ALMOND

FIG. 2

SYSTEM OF FURNITURE MERCHANDISING AND SELECTION

This is a continuation application of Ser. No. 07/510,103, filed Apr. 17, 1990, now U.S. Pat. No. 5,152,689.

FIELD OF ART

The field of art to which the invention relates comprises the merchandising and selection of pre-fabricated furniture, such as cabinets and component cabinet parts for custom design of a living space.

BACKGROUND OF INVENTION

Individual cabinets and associated cabinet accessories are typically either of a pre-fabricated construction or custom built on-site by skilled cabinet makers. However, custom built on-site cabinetry is considerably more expensive than pre-fabricated construction due to the higher labor charges associated with the services of skilled tradesmen. The overall installation is therefore considerably more costly than might otherwise occur if it were possible to eliminate much of this labor expense. The ideal situation, from a cost standpoint, would therefore be to provide prefabricated cabinets for quick and easy selection by the do-it-yourselfer.

DESCRIPTION OF THE PRIOR ART

While various merchandising techniques have been developed for the do-it-yourself market, a quick, convenient and effective method for custom cabinet planning and selection by the less skilled, more novice, do-it-yourself handyman has not been available prior to this invention. As a consequence, this area of the do-it-yourself market has not been effectively tapped.

OBJECTS OF THE INVENTION

It is therefore an object of the present invention to provide a novel system for the planned selection and installation of custom quality pre-fabricated cabinets for selected living spaces.

It is a further object of the invention to effect the previous object with a highly simplified approach enabling relative unskilled workmen to select and install cabinetry in a pre-planned arrangement at lower costs than heretofore achieved.

It is a still further object of the invention to effect the previous objects with reduced labor costs, economic efficiency, and simplicity of selection of desired cabinet combinations.

SUMMARY OF THE INVENTION

This invention relates to an improved method and system for the planning, merchandising, and selection of custom quality cabinet structures for a living space such as a kitchen, den, living room, bedroom, etc. More specifically, the invention relates to a coordinated system that readily lends to the layout, planning, selection, and merchandising of high quality cabinet combinations in clustered arrangements.

The foregoing is achieved in accordance with the invention by prepackaging unassembled furniture components, such as wall and base cabinet units, in color coded cartons corresponding to the particular category of such components. The individual cabinet units within a particular category grouping, but of different dimensions, are then furthermore designated by alpha-numeric coding representative of such dimensional differences. The color and alpha-numeric coded merchandise are then depicted and listed in customer brochures and graphic materials from which the desired merchandise can readily be identified and then selected from the correspondingly coded merchandise display of cartons containing the unassembled furniture components.

Being merchandised in this manner enables rapid and convenient selection of the desired cabinet units by the consumer by choosing the selected cartons from the shelf in accordance with their respective identifying coded indicia. Once purchased and removed to the site of installation, the cabinets can then be readily assembled pursuant to instructions and a previously prepared layout. Thus, the resulting ease of selection is of value to any class of purchaser, and particularly the do-it-yourself handyman.

Additional features and advantages of the present invention will become readily apparent and appreciated by those skilled in the art upon reading the following detailed description of a preferred embodiment of the invention taken in conjunction with the accompanying drawings.

BRIEF DESCRIPTION OF THE DRAWINGS

FIG. 1 represents a graphic depiction of various cabinet types and accessories as would appear in a consumer brochure or the like, in which the various furniture components are grouped together by category, with color coding being indicative of the particular category, and alpha-numeric coding being indicative of different dimensional units within each category grouping;

FIG. 2 is a typical selection chart for listing the cabinets and accessories of FIG. 1 and their corresponding numbered merchandise carton;

DESCRIPTION OF THE PREFERRED EMBODIMENT

Figure 3:
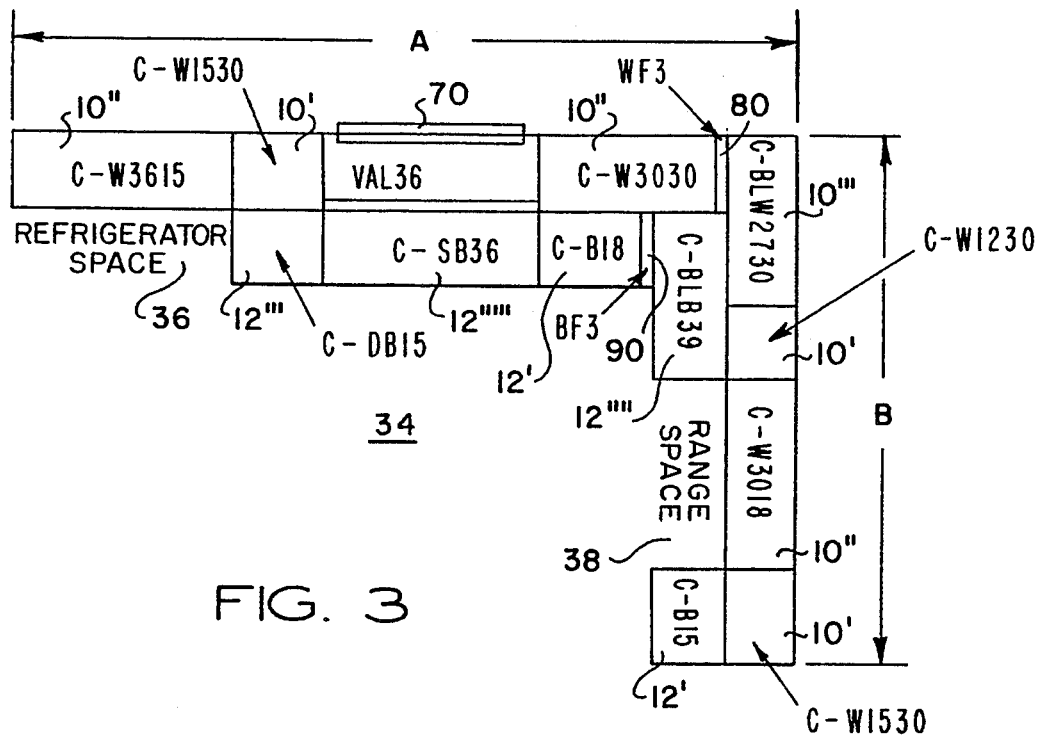
FIG. 3 is a plan layout of an exemplary kitchen area in which the cabinets and components of FIG. 1 are to be installed.

In the description which follows, like parts are respectively designated throughout the specification and the drawings with the same reference numerals. The drawings are not necessarily to scale, and in some instances portions have been exaggerated for purposes of clarity.

Referring now to the drawings, and initially to FIG. 1, various cabinet or furniture items are depicted as they would be in a customer brochure or other similar printed display, the items grouped in accordance with the color coding and the alpha-numeric coding format of the present invention. For example, wall cabinets 10 of varying categories 10', 10" and 10'" are respectively grouped adjacent color code designators "R", "B", and "Y" respectively representing, for example, color squares red, blue, and yellow backgrounds. Similarly, base cabinets 12 are arranged into category groups 12', 12″, 12‴, 12⁗, and 12‴‴, with color code designators "G", "L", "P", "K" and "O" respectively representing, for example, color squares of light green, lavender, purple, dark green and orange, being respectively disposed adjacent each such category. A third grouping of accessories 30, such as dishwasher returns, fillers, valances, etc., may have a color code designator "C" of a dark gray background, for example, adjacent and identifying such grouping.

Each of the cabinets and accessories of each grouping are of the same type, but of different dimensions. Consequently, each item of a category grouping also has associated therewith an alpha-numeric code designation comprised of initial letters, such as "C-W" (Cabinet-Wall), followed by numerical digits representing its particular dimension. For example, the first wall cabinet in the "red" grouping 10′ is designated by the alpha-numeric C-W 1230, the first two numbers "12" representing the width of that cabinet in inches, and the second two numbers "30" representing its height For the base cabinets 12′, 12″, 12‴, etc., the models are of a standard height, typically 34½ inches, with the alpha-numeric coding being C-B (Cabinet-Base) followed by the numeric representing the cabinet width. Thus C-B15 is the base cabinet, category code 12′, having a 15 inch width. With respect to the accessories 30, the number in the model code, for example the "3" in WF3 likewise represents its width in inches.

FIG. 2 represents a customer selection chart on which the various cabinet models depicted in FIG. 1 are listed (Column 18), along with the box number (Column 14) in which that unassembled cabinet is packaged with the color coding associated with that particular box being summarized in Column 16. Furthermore, adjacent each cabinet model is the model number the cabinet door to be associated with that cabinet, indicating the model number of a white door (Column 20) or an almond door (Column 22). The white background accessories are listed in column 24 and the almond in column 26, along with the identification of the boxes (21-27) in which they are packaged bearing the color coded gray background designator "C".

Figure 5:
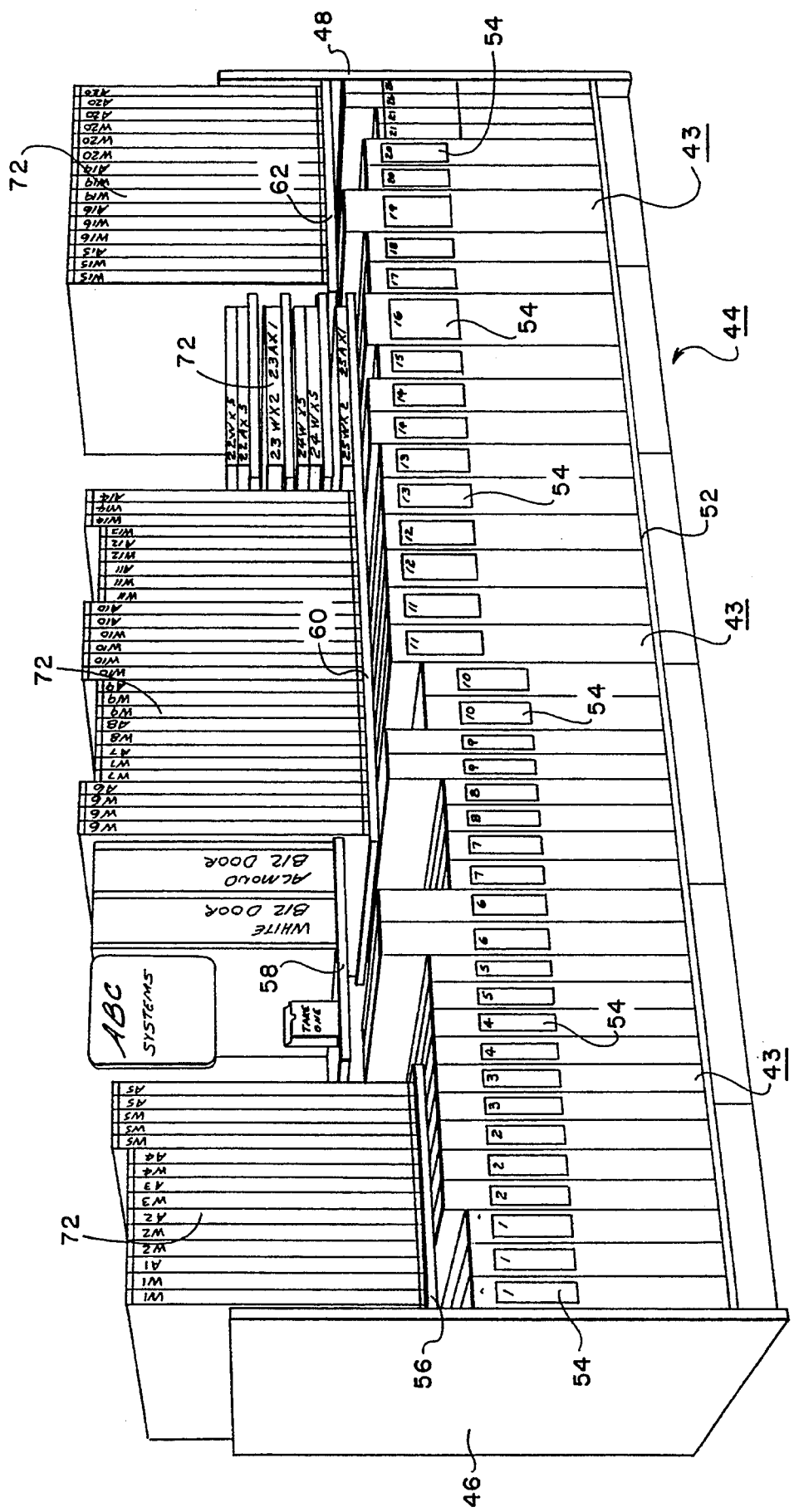
FIG. 5 is a merchandise display of the inventory of cabinets and accessories in their cartons, each carton having coding corresponding to the coding set out in FIGS. 1 and 2.
Figure 6:
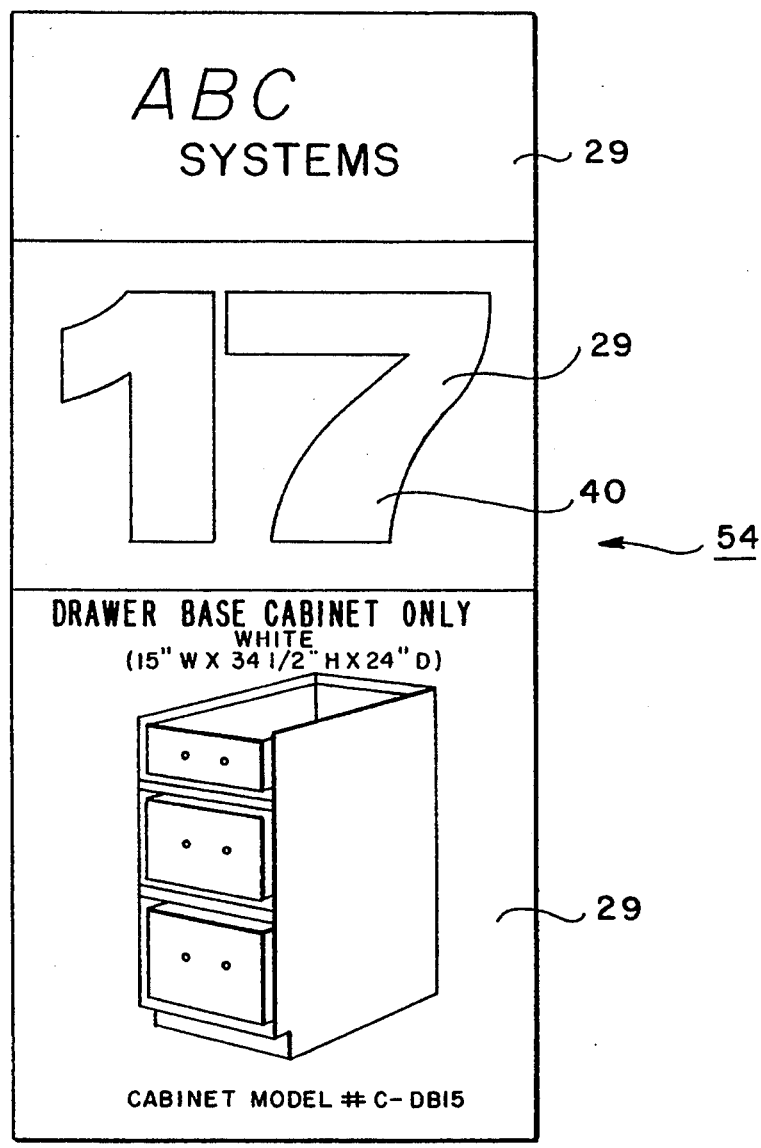
FIG. 6 is a typical label from the face of the cartons depicted in FIG. 5 reflecting the merchandise coding technique of the invention.

As best illustrated in FIGS. 5 and 6, the packaged merchandise is presented and displayed to the consumer in accordance with the same color coding as previously described with reference to FIG. 1. It is to be understood that this display is only by way of example, as the method of this invention is equally applicable, for example, to warehouse racks or other fixture displays, with the merchandise being any type of fixture.

Specifically, the wall cabinets 10, base cabinets 12, and accessories 30 are pre-boxed unassembled in cartons 43 stacked on a lower shelf 52 of a merchandise gondola type display case 44 having end walls 46 and 48. In accordance with a unique feature of the invention, each of the cartons 43 has at its front face a label 54 (FIG. 6) bearing color background segments (for example at portions 29) respectively corresponding to the background color of the color code designator representing the furniture item within the package and as depicted in FIG. 1. In the example shown in FIG. 6, the color is purple. Furthermore, each box bears a number designator 40 (in the illustrated example, the number 17) corresponding to the box number listed in column 14 of the sheet depicted in FIG. 2 containing the particular furniture item.

As specifically illustrated in FIG. 5, all the cartons 54 are stacked in numerically ascending order from left to right and grouped according to the color code which designates the particular group. The wall cabinets 10 are thus in boxes 1-10 (and in color groupings red, blue and yellow), while the boxes 11-20 contain the base cabinets 12 (in color groupings green, lavender, purple, dark green and orange, respectively). The accessories 30 are in boxes 21-27 with dark gray color coding.

At the top of the gondola on shelves 56, 58, 60, and 62 are disposed additional cartons 72 containing the various doors and other components. These cartons can also be color coded and numbered to correspond to the various furniture item color coding.

In accordance with the utilization of the system of the invention the consumer first procures a brochure depicting the various furniture components shown in FIG. 1. Next, and with reference to FIG. 3, the dimensions "A" and "B" of the particular living space 34 to be "cabineted" is determined, the dimensions of the cabinets and/or other fixtures to fill the space calculated, and a scaled plan like that shown in FIG. 3 prepared. For example, the particular living space 34 shown in FIG. 3 is a kitchen in which cabinets are to be installed in clusters about a refrigerator space 36, a stove or range space 38, and a window 40 (FIG. 4) behind a sink or wash basin 42. Based upon one's desired category and the height and width dimensional availability, wall cabinets 10″ [color coding B] are selected for the spaces shown, with the different dimensions chosen [as indicated by C-W 3615, CW 3030, and CW 3018]. In similar manner, wall cabinets 10′ (coding R), wall cabinet 10‴ (coding Y), base cabinets 12′ (coding G), 12‴ (coding P), 12⁗ (coding K), and 12‴‴ (coding O), valance 70 (coding C), and fillers 80 and 90 (coding C) are selected for the plan.

Figure 4:
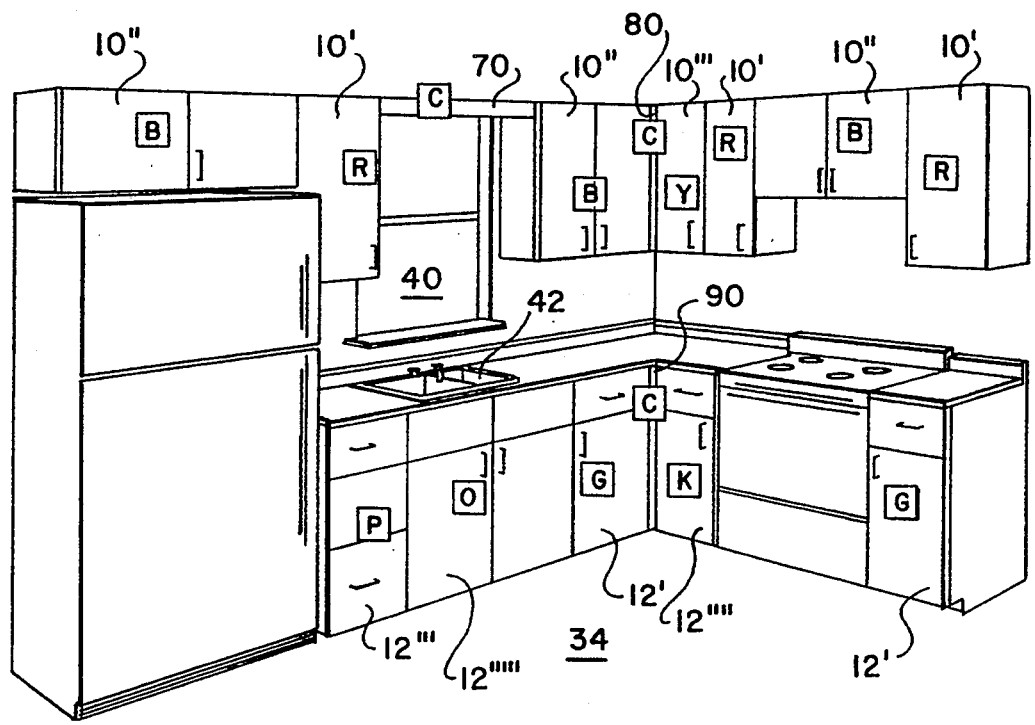
FIG. 4 is a perspective view of the kitchen area after the cabinets and components have been installed in accordance with the layout of FIG. 3.

Once the plan scaled layout shown in FIGS. 3 and 4 is completed to satisfaction, it remains only to purchase and install the various cabinet and accessory items in conformity with the plan. From that point the customer proceeds to a suitable commercial outlet where the various components for the selected cabinets can be readily purchased. From the chart of FIG. 2, the correlated color code and box number indicia can be readily obtained, and the customer can readily identify and easily select the desired items from the display on the gondola 44 (FIG. 5) by the color and alpha-numeric coded label 54 (FIG. 6) on the front of each carton.

With the approach of this invention, not only is the selection of the various cabinets and furniture components significantly simplified, but the reordering and restocking by the merchant is facilitated.

Although the invention has been specifically described in association with a clustered installation of cabinets in a kitchen area, it will be appreciated that the method and system hereof can be readily adapted for application to the furnishing of essentially any living space. Moreover, while the invention has been described in a specific combination of color and/or alpha-numerical code indicia, the coding method and display may alternatively utilize, for example, print patterns, rather than colors, for the category group coding.

Other changes and modifications of the above described embodiment, as well as other embodiments, will become apparent without departing from the scope of the invention as solely defined by the appended claims.

What is claimed is:

1. A merchandise display of kit components for the assembly of furniture items, comprising in combination:

(a) a plurality of sets of prepackaged unassembled components within carton means arranged as a display grouping, the components within each carton to be assembled into a finished furniture item;

(b) label means associated with said carton means having first visual coding in which different first visual coding represents finished furniture items of different categories and identical first visual coding represents finished furniture items of the identical category;

(c) said label means furthermore having second visual coding in which different second visual coding represents finished furniture items of different dimensions; and (d) a graphic display associated with said display grouping depicting the finished furniture items and having, as a part thereof, visual coding for said depicted items corresponding to the said first and second visual coding associated with said carton means.

2. The combination as set out in claim 1 in which said furniture items are cabinets.

3. A merchandise display of kit components for the assembly of cabinets, comprising in combination:

(a) a plurality of sets of prepackaged unassembled components within cartons arranged as a display grouping, the components within each carton to be assembled into a finished cabinet;

(b) label means associated with each of said cartons having different visual coding respectively corresponding to finished furniture items of different categories;

(c) label means associated with each of said cartons having different visual coding respectively corresponding to finished cabinets of different dimensions; and (d) a plurality of sets of prepackaged cabinet doors with the packaging for such doors visually coded to respectively correspond to the visual coding associated with the cartons for said cabinet components.

4. A merchandise display of kit components for the assembly of cabinets, comprising in combination:

(a) a plurality of sets of prepackaged unassembled components within cartons arranged as a display grouping, the components within each carton to be assembled into a finished cabinet;

(b) label means associated with each of said cartons having different visual coding respectively corresponding to finished cabinets of different dimensions; and (c) a plurality of sets of prepackaged cabinet doors with the packaging for such doors visually coded to respectively correspond to the visual coding associated with the cartons for said cabinet components.

* * * * *